United States Patent
Browne et al.

(10) Patent No.: US 8,344,868 B2
(45) Date of Patent: *Jan. 1, 2013

(54) MAINTENANCE OF PROPER TIRE INFLATION PRESSURE THRU ACTIVE MATERIAL ACTUATION

(75) Inventors: Alan L. Browne, Grosse Pointe, MI (US); Nancy L. Johnson, Northville, MI (US); Howard William Cox, Bloomfield Hills, MI (US); William R. Rodgers, Bloomfield Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 754 days.

This patent is subject to a terminal disclaimer.

(21) Appl. No.: 12/489,402

(22) Filed: Jun. 22, 2009

(65) Prior Publication Data

US 2009/0315696 A1 Dec. 24, 2009

Related U.S. Application Data

(60) Provisional application No. 61/075,018, filed on Jun. 24, 2008.

(51) Int. Cl.
*B60C 23/00* (2006.01)
*H02N 1/04* (2006.01)

(52) U.S. Cl. ............ 340/442; 340/451; 340/425.5; 73/146.2; 73/146.5; 310/311; 152/415; 152/429

(58) Field of Classification Search ............ 340/442; 73/146.3
See application file for complete search history.

(56) References Cited

U.S. PATENT DOCUMENTS

| | | | |
|---|---|---|---|
| 5,587,698 A | 12/1996 | Genna | |
| 6,401,779 B1 * | 6/2002 | Riva et al. | 152/527 |
| 6,725,713 B2 * | 4/2004 | Adamson et al. | 73/146.5 |
| 6,976,391 B2 * | 12/2005 | Maquaire | 73/146 |
| 7,117,731 B2 * | 10/2006 | Hrabal | 73/146 |
| 2004/0066287 A1 * | 4/2004 | Breed et al. | 340/442 |
| 2006/0021690 A1 * | 2/2006 | Bunker | 152/419 |
| 2006/0225494 A1 | 10/2006 | Silverbrook et al. | |
| 2008/0202657 A1 * | 8/2008 | Hammel | 152/152.1 |
| 2008/0289407 A1 * | 11/2008 | Gramling et al. | 73/146.5 |
| 2009/0314404 A1 * | 12/2009 | Rodgers et al. | 152/209.5 |
| 2009/0314406 A1 * | 12/2009 | Browne et al. | 152/503 |
| 2011/0024010 A1 * | 2/2011 | Browne et al. | 152/209.5 |

FOREIGN PATENT DOCUMENTS

| | | |
|---|---|---|
| JP | 11-509157 A | 8/1999 |
| JP | 03-786951 B1 | 3/2006 |
| WO | 2005-102743 A1 | 11/2005 |

\* cited by examiner

*Primary Examiner* — Donnie Crosland

(57) ABSTRACT

An adaptive tire utilizing active material actuation to sense and/or modify an excessive and/or low inflation pressure, so as to autonomously maintain proper inflation pressure.

15 Claims, 2 Drawing Sheets

MAINTENANCE OF PROPER TIRE INFLATION PRESSURE THRU ACTIVE MATERIAL ACTUATION

RELATED APPLICATIONS

This patent application claims priority to, and benefit from U.S. Provisional Patent Application Ser. No. 61/075,018, entitled "METHODS OF ENHANCING TIRE PERFORMANCE UTILIZING ACTIVE MATERIALS," and filed on Jun. 24, 2008, the disclosure of which being incorporated by reference herein.

BACKGROUND OF THE INVENTION

1. Field of the Invention

The present disclosure generally relates to tires, such as automobile tires, and more particularly to a tire adapted for and method of maintaining proper inflation pressure utilizing active materials.

2. Discussion of Prior Art

Properly functioning tires are not only important to ensure the health and safety of the user, but they also play a role in maintaining optimal fuel efficiency. To accomplish both tasks, a proper balance must often be struck, perhaps nowhere is this more widely felt than with respect to inflation pressure. For example, it is appreciated by those of ordinary skill in the art that a hypo-inflated tire may cause too great of a contact patch and excessive stress within the sidewalls, while a hyper-inflated tire may result in an insufficient patch and therefore, insufficient traction. Moreover, hypo-inflation typically contributes to excessive "rolling resistance" (i.e., the tendency for a tire to stop rolling under load) thereby reducing fuel economy.

Concernedly, control of inflation pressure is difficult, as it is also appreciated that many ambient and inherent conditions, including outside temperature, and the stiffness and integrity of the tire material may cause it to fluctuate undesirably. Conventional tires typically provide an air valve whereupon an air pressure gauge may be applied to determine an improper (i.e., excessive or low) inflation pressure. An excessive or low pressure is then manually cured by bleeding off the excess pressure or adding air, respectively. More recently, conventional valve assemblies employing automatic pressure sensors (e.g., TPMs) have been developed to detect and inform a user of an excessive or low pressure condition. However, in these applications, manual modification of air pressure is still required.

BRIEF SUMMARY

The present invention concerns an adaptive or "smart" tire that is able to autonomously sense and/or modify inflation pressure, which promotes the maintenance of optimal tire performance over a wide range of conditions. The invention is useful for tuning characteristics of the tire to dynamically control rolling resistance, particularly during the first 20 to 30 minutes of operation from a cold start condition. The invention is further useful for improving fuel economy by maintaining the inflation pressure of the tire at all times at a level desired for long term steady state operation. Finally, the inventive tire uses the advantages of active material actuation to rapidly achieve and maintain proper inflation pressures, independent of ambient or inherent conditions.

In general, the inventive tire presents and is adapted to selectively (e.g., when either excessive or low) modify an inflation pressure. The tire includes a structural component that at least partially defines a confined space, wherein a quantity of air is retained to produce the inflation pressure. The tire further includes at least one active material element operable to undergo a reversible change in a fundamental property when exposed to or occluded from an activation signal. The change in property is operable to sense the pressure, and/or modify the pressure by increasing or reducing the quantity of air. Thus, a method of autonomously maintaining proper inflation pressure is presented, and includes determining an excessive or low pressure, activating an active material element, when the excessive or low pressure is determined, causing air to leave or enter the tire as a result of activating the element, and deactivating the element when determining a proper pressure. Various exemplary active materials, and configurations are provided.

The above described and other features are exemplified by the following figures and detailed description.

BRIEF DESCRIPTION OF THE DRAWINGS

Preferred embodiments of the invention are described in detail below with reference to the attached drawing figures of exemplary scale, wherein.

DETAILED DESCRIPTION

The present invention concerns plural methods of enhancing tire performance utilizing active material actuation, and smart tires 10 employing the same. In general, the inventive tire 10, described and illustrated herein employs active material actuation and/or sensory capability to sense and/or modify the inflation pressure of the tire 10. As such, the inventive tire 10 is operable to improve tire performance (FIGS. 1-4*b*) by maintaining optimal inflation pressure over varying conditions, including during cold start conditions. The advantages and benefits of the invention may be used with various transportation applications (e.g., with respect to bicycles, aviation, etc.), but are more particularly suited for use with an automotive vehicle 12 (e.g., motorcycle, car, truck, SUV, all-terrain vehicle, etc.). As such, the term "vehicle" as used herein shall encompass any device that would benefit from the autonomous maintenance of optimal inflation pressure, including bicycles.

Figure 2:
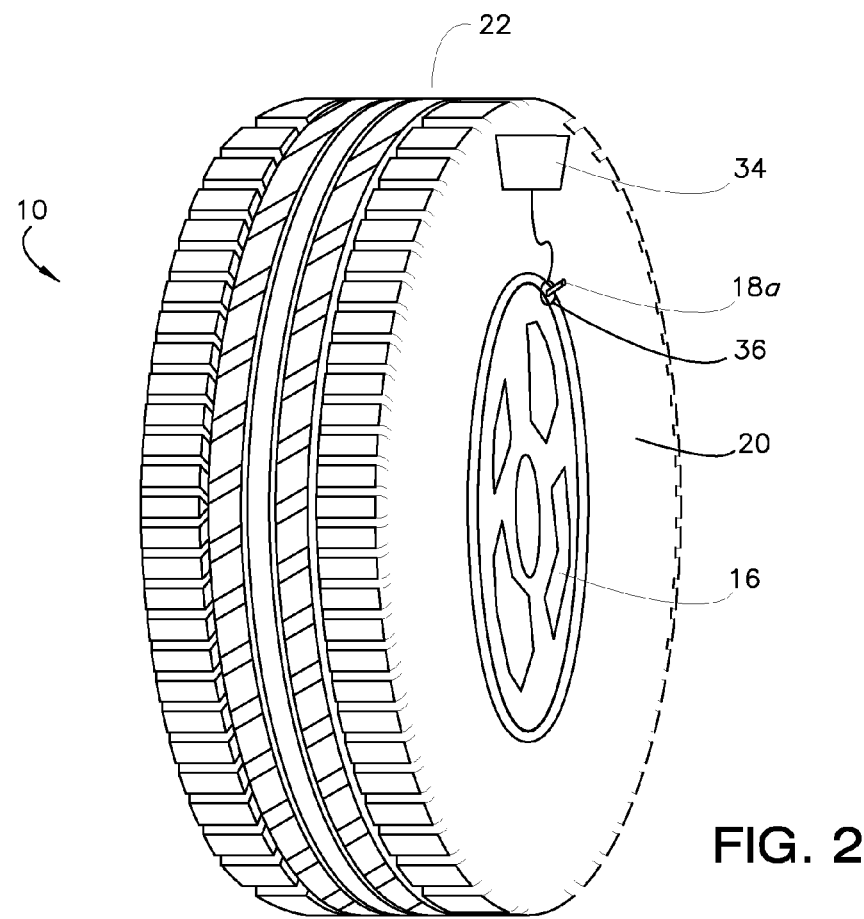
FIG. 2 is a perspective view of the tire shown in FIG. 1, particularly showing an air valve assembly fluidly coupled to an interior region defined by the tire, and a piezoelectric energy harvesting mechanism coupled to the valve assembly, in accordance with a preferred embodiment of the invention.

As best shown in FIG. 2, the inventive modifications are adapted for use with an otherwise conventional elastomeric (e.g., synthetic and/or natural rubber) tire that defines an interior region 14 when mounted upon a wheel 16. A valve assembly 18, including a valve stem 18*a*, perforates the tire 10, fluidly couples the region 14 to an ambient environment or compressed air supply (not shown), and enables air to enter the region 14, so as to inflate the tire 10 to a "proper" or recommended long term steady state operating inflation pressure.

Figure 1:
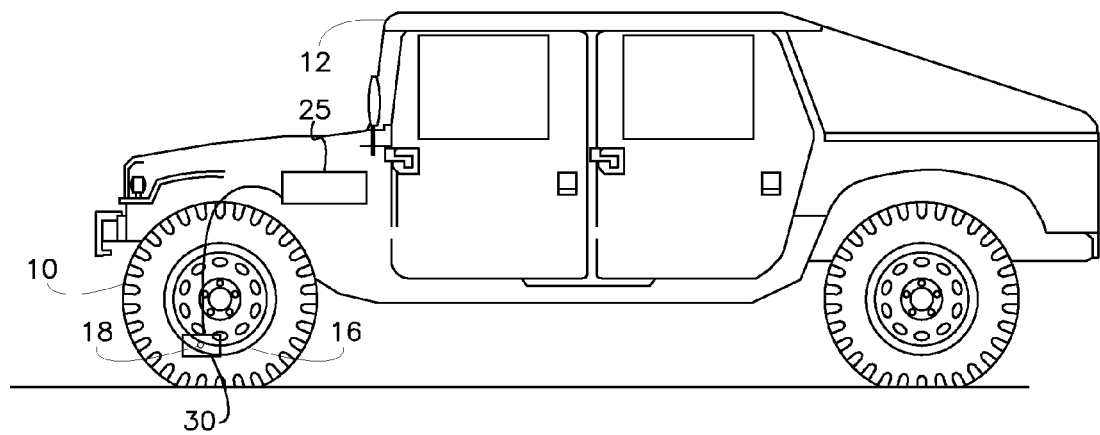
FIG. 1 is an elevation of a vehicle employing a smart tire, power source, and controller, in accordance with a preferred embodiment of the invention.

As is well known in the art, the tire 10 is essentially formed by a plurality of reinforced structural components, including first and second opposite sidewalls 20 interconnected by a treadwall 22. The sidewalls 20 and treadwall 22 provide lateral and circumferential stability to the tire 10 and together with the compressed air transfers the weight of the vehicle 12, as well as operational forces to the road surface. As shown in FIG. 1, it is appreciated that the sidewalls 22 undergo deformation as the tire 10 rolls, and that this deformation contributes to rolling resistance. Finally, it is appreciated that the afore-described tire is described for exemplary purposes only, and that the present invention may be used with tires of various configuration not described herein.

I. Active Material Discussion and Function

As previously mentioned, the inventive tire 10 employs the use of at least one active material element 24 as a sensor and/or actuator. As used herein the term "active material" shall be afforded its ordinary meaning as understood by those of ordinary skill in the art, and includes any material or composite that exhibits a reversible change in a fundamental (e.g., chemical or intrinsic physical) property, when exposed to an external signal source. Thus, active materials shall include those compositions that can exhibit a change in stiffness, modulus, shape and/or dimensions in response to the activation signal.

Depending on the particular active material, the activation signal can take the form of, without limitation, an electric current, an electric field (voltage), a temperature change, a magnetic field, a mechanical loading or stressing, and the like, and, as such, it is appreciated that a sufficiently capable source 25 is communicatively coupled to the element 24. For example, a magnetic field may be applied for changing the property of the active material fabricated from magnetostrictive materials. A heat signal may be applied for changing the property of thermally activated active materials such as SMA. An electrical signal may be applied for changing the property of the active material fabricated from electroactive materials, piezoelectrics, and/or ionic polymer metal composite materials. In the present invention, it is appreciated that suitable sources for activating heat and electrically activated materials include the charging system of the vehicle 12.

Suitable active materials for use with the present invention include, without limitation, shape memory alloys (SMA), electroactive polymers (EAP), piezoelectric materials (both unimorphic and bimorphic), magnetostrictive materials, electrostrictive materials, magnetorheological elastomers, electrorheological elastomers, and the like. The active material element 24 may take many geometric forms including sheets, layers, and wires, wherein the term "wire" is further understood to encompass a range of longitudinal forms such as strands, braids, strips, bands, cables, slabs, springs, etc.

More particularly, SMA generally refers to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or martensite phase, shape memory alloys can be plastically deformed and upon exposure to some higher temperature will transform to an austenite phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior.

Shape memory alloys exist in several different temperature-dependent phases. The most commonly utilized of these phases are the so-called Martensite and Austenite phases discussed above. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$).

When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). Generally, the shape memory alloys are softer and more easily deformable in their martensitic phase and are harder, stiffer, and/or more rigid in the austenitic phase. In view of the foregoing, a suitable activation signal for use with shape memory alloys is a thermal activation signal having a magnitude to cause transformations between the martensite and austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the original shape.

Intrinsic and extrinsic two-way shape memory materials are characterized by a shape transition both upon heating from the martensite phase to the austenite phase, as well as an additional shape transition upon cooling from the austenite phase back to the martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, this temperature can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Thus, for the purposes of this invention, it is appreciated that SMA's exhibit a modulus increase of 2.5 times and a dimensional change of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. Joule heating can be used to make the entire system electronically controllable. Stress induced phase changes in SMA are, however, two way by nature. Application of sufficient stress when an SMA is in its Austenitic phase will cause it to change to its lower modulus Martensitic phase in which it can exhibit up to 8% of "superelastic" deformation. Removal of the applied stress will cause the SMA to switch back to its Austenitic phase in so doing recovering its starting shape and higher modulus.

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly(poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric materials can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof and Group VIA and IB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive, molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity— (for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

Magnetostrictives are commonly termed active materials and yet the relative magnitude of the magnetostrictive effect ranges hugely over the various materials that are lumped in this class, for example "Terfinol" (R) exhibiting a giant magnetostrictive effect and Galfenol (Sp) exhibiting a "large" magnetostrictive effect. Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

Desirably, the change in the property of the active material remains for the duration of the applied activation signal. In one embodiment, upon discontinuation of the activation signal, the property of the active material generally reverts to an unpowered form and returns substantially to its original property. As used herein, the term "return mechanism" generally refers to any component capable of providing a force opposite to a force provided by the active material, and includes, without limitation, springs, elastomers, additional active materials, and the like.

Subdivisions and/or combinations of active material can provide additional desirable device benefits, such as improved package size, reduced weight, increased design scalability, larger angular displacements or torques, a digital or step-like actuation, a stacked or staggered actuation to improve controllable resolution, an active reset spring, or differential actuation via antagonistic wire configurations. Active material subdivisions may be configured electrically or mechanically in series or parallel and mechanically connected in telescoping, stacked, or staggered configurations. The electrical configuration may be modified during operation by software timing, circuitry timing, and external or actuation induced electrical contact.

II. Exemplary Smart Tire Configurations and Methods of Use

A first aspect of the invention involves approaches to reducing tire rolling resistance and otherwise optimizing tire performance by maintaining proper inflation pressure within the tire 10 at all times. That is to say, the tire 10 is configured to maintain inflation pressure at a constant level independent of operating state and conditions. For example, the tire 10 is configured to ensure proper inflation pressure during the first 20 to 30 minutes of driving from a cold start condition, as it is appreciated that higher values of rolling resistance are experienced during this period.

Figure 3:
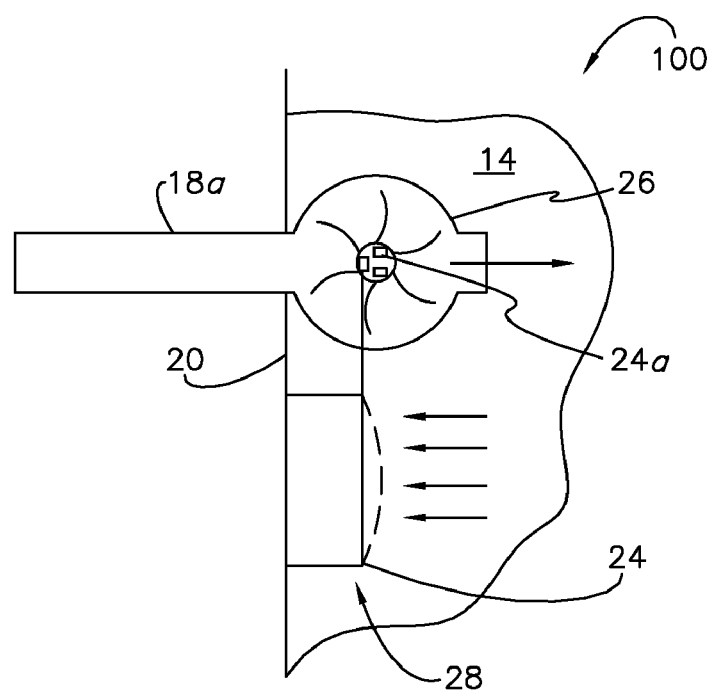
FIG. 3 is a schematic diagram of a valve assembly including a pump, an active material element operatively coupled to the pump, and a sensor, in accordance with a preferred embodiment of the invention.

In one embodiment, an EAP, Piezoelectric, or magnetostrictive (e.g., giant magnetostrictive, such as Terfinol D) driven pump 26 may be secured on the interior of the sidewalls 20 or treadwall 22 and within the region 14 proximate the valve assembly 18 (FIG. 3). The pump 26 is fluidly coupled to the valve stem 18a and activated when a low inflation pressure is determined, e.g., sensed by a sensor 28, or anticipated. The sensor 28 may itself be active material based. For example, a piezoelectric sensor 28 may be caused to deflect under a low pressure (as shown in hidden line type in FIG. 3) and deliver an electric signal to the preferably active-material based actuator of the pump 26 or to an accumulator/storage device (not shown). In addition to the sensor 28, other input devices may be used for example, by a user to modify the inflation pressure on demand (e.g., to facilitate mounting, etc.). Finally, it is appreciated that the preferred sensor/device 28 is communicatively coupled to a controller 30, which is also coupled to the source 25, and element 24, such that the sensor 28, controller 30, and source 25 are cooperatively configured to cause the pump 26 to activate only when the input is received (FIG. 3) and a low pressure is determined.

The low pressure may be defined as an inflation pressure below a predetermined threshold. For example, the threshold may be a percentage (e.g., 90%) of the proper inflation pressure. Where a piezopolymer or piezoceramic in bimorphic or unimorphic element is used to drive the pump 26, the element 24 preferably exhibits a designed-in-stiffness that passively limits the inflated-to pressure. Alternatively, the pump 26 may be driven by a plurality of sequentially activated piezoelectric composites 24a that cooperate to cause rotary motion and effect a pressure differential (FIG. 3). Once actuated, the pump 26 is operable to draw air into the region 14, thereby increasing the inflation pressure therein. When the inflation pressure returns to the proper or targeted level, the pump 26 is turned off by deactivating the elements 24.

Figure 4:
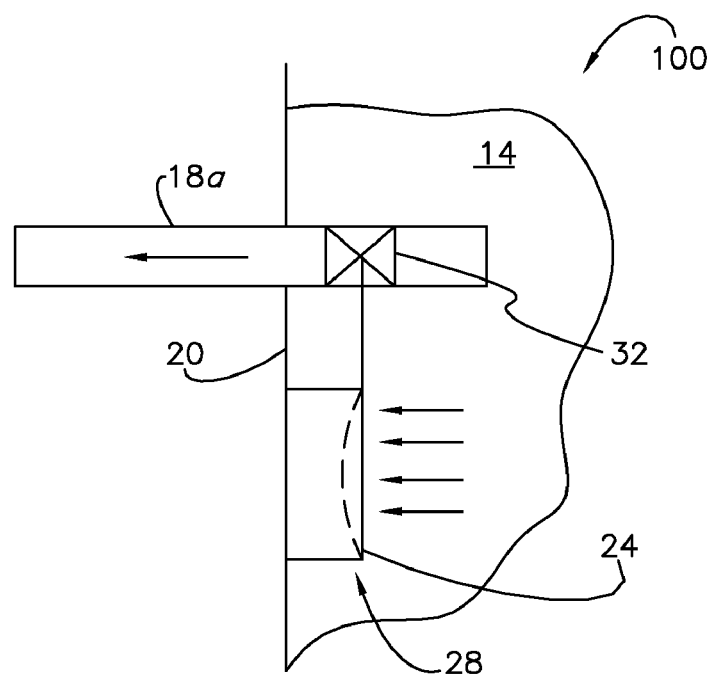
FIG. 4 is a schematic diagram of a valve assembly including a release valve, an active material sensor operatively coupled to the valve, in accordance with a preferred embodiment of the invention.

Similarly, and as shown in FIG. 4, an active material release valve 32 based, for example, on SMA, piezoelectric, EAP, magnetostrictive and/or MR technology may be used to reduce an excessive inflation pressure that may result, for example, from tire warm-up. The release valve 32 is fluidly coupled to the valve stem 18a. In a first example, an Austenitic SMA element 24 is mechanically coupled to and operable to passively control the opening and closing of the valve 32. The element 24 is configured to actuate when the pressure exceeds a predetermined threshold or percentage (e.g., 110%) of the proper inflation pressure, by utilizing stress-induced superelasticity. That is to say, the SMA element 24 may be sized to deform only when the pressure acting either directly or indirectly upon it exceeds the prescribed threshold. As such, it appreciated that the element 24, in this configuration, further acts as a sensor.

In a second example, a piezopolymer or piezoceramic in bimorphic or unimorphic element 24 may be employed to deflect passively only under an excessive pressure, and cause the valve 32 to open as a result of deflection. Here, the piezoelectric element 24 is electrically coupled to the valve 32, and again, acts as a sensor. Finally, in a third example, a signal from the pressure sensor 28 may be used to activate either an MR, magnetostrictive, piezoelectric, or SMA/spring steel bi-layer flow restrictor or valve 32, so as to reduce the pressure.

Where Martensitic SMA is used, the resistively activated element 24 is mechanically coupled to the valve 32, and preferably pre-stretched to effect more instantaneous response.

In the afore-mentioned configurations, if not activated passively, the power source 25 may also be provided by using a piezoelectric based mechanism 34 to harvest energy associated with the cyclic deformation that results when the tire 10 is caused to roll under load. For example, a piezoelectric composite 34 may be disposed along the outer radial half of the sidewall 20 (FIG. 2), so as to be caused to undergo deformation and produce a charge as it enters and exits the contact patch. The energy so harvested may be stored, for example, in a capacitor 36 functionally linked to the pressure sensor/input device 28, controller 30, and inflator pump 26 and/or release valve 32 (collectively illustrated as "system 100", FIGS. 3 and 4).

As used herein, the terms "first", "second", and the like do not denote any order or importance, but rather are used to distinguish one element from another, and the terms "the", "a", and "an" do not denote a limitation of quantity, but rather denote the presence of at least one of the referenced item. Furthermore, all ranges directed to the same quantity of a given component or measurement is inclusive of the endpoints and independently combinable.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A tire presenting and adapted to selectively modify an inflation pressure, said tire comprising:
   a structural component at least partially defining a confined space, wherein a quantity of air is retained to produce an inflation pressure upon the component; and
   at least one active material element operable to undergo a reversible change in a fundamental property when exposed to or occluded from an activation signal, wherein the element is formed of an active material selected from the group consisting essentially of shape memory alloys, electroactive polymers, magnetostrictives, and magnetorheological elastomers;
   said change being operable to sense the pressure, and/or modify the pressure by increasing or reducing the quantity.

2. The tire as claimed in claim 1, further comprising an energy harvesting mechanism engaged with the component, communicatively coupled to the element, and operable to extract energy from a deformation of the component and selectively expend the extracted energy, so as to activate the element.

3. The tire as claimed in claim 2, wherein the mechanism includes a capacitor operable to store the energy.

4. The tire as claimed in claim 2, wherein the mechanism includes a piezoelectric composite disposed along the component so as to be caused to deform when the tire rolls.

5. The tire as claimed in claim 1, wherein the active material element is formed of Martensitic shape memory alloy and is pre-stretched.

6. The tire as claimed in claim 1, further comprising:
   a pump fluidly coupled to the space,
   said element being drivenly coupled to the pump,
   said pump and element being cooperatively configured to increase the quantity, as a result of the change.

7. The tire as claimed in claim 6, further comprising:
   a pressure sensor communicatively coupled to the space and operable to detect a low pressure less than a predetermined threshold,
   said sensor, pump and element being cooperatively configured to increase the quantity, when the low pressure is detected.

8. The tire as claimed in claim 1, further comprising:
   a release valve fluidly coupled to the space,
   said element being drivenly coupled to the valve,
   said valve and element being cooperatively configured to decrease the quantity, as a result of the change.

9. The tire as claimed in claim 8, wherein said at least one element includes an Austenitic shape memory alloy element configured to be deformed by the pressure, when the pressure is greater than a predetermined threshold.

10. An autonomous tire inflation system adapted for use with a vehicle, said system comprising:
    a tire having a structural component at least partially defining a confined space, wherein a quantity of air is retained to produce a first inflation pressure upon the component;
    at least one active material element drivenly coupled to the component, and operable to undergo a reversible change in a fundamental property when exposed to or occluded from an activation signal, wherein the element is formed of an active material selected from the group consisting essentially of shape memory alloys, electroactive polymers, magnetostrictives, and magnetorheological elastomers;
    a signal source operable to produce the signal;
    an input device operable to receive an input; and
    a controller communicatively coupled to the source, element, and device, and configured to cause the change when the input is received,
    said change being operable to modify the pressure by increasing or reducing the quantity.

11. The system as claimed in claim 10, wherein the device is a pressure sensor, and the input is an excessive or low pressure reading.

12. The system as claimed in claim 10, wherein the source is a charging system composing the vehicle.

13. A method of autonomously maintaining a proper inflation pressure within a tire, said method comprising:
    a. determining an excessive or low pressure greater or less than the proper pressure respectively;
    b. activating an active material element, when the excessive or low pressure is determined, wherein the element is formed of an active material selected from the group consisting essentially of shape memory alloys, electroactive polymers, magnetostrictives, and magnetorheological elastomers;
    c. causing air to leave the tire, when an excessive pressure is determined, or enter the tire, when a low pressure is determined, as a result of activating the element;
    d. determining the proper pressure; and
    e. deactivating the element.

14. The method as claimed in claim 13, wherein step a) further includes the steps of determining the excessive or low pressure by activating a second active material element.

15. The method as claimed in claim 13, wherein the element is drivenly coupled to a pump or release valve, and step c) further includes the steps of actuating the pump or valve as a result of activating the element.

* * * * *